United States Patent [19]
Petterson et al.

[11] Patent Number: 5,967,082
[45] Date of Patent: Oct. 19, 1999

[54] DEVICE FOR RECEPTION OF A TEAT AND A METHOD FOR ITS MANUFACTURE

[75] Inventors: Torbjörn Petterson, Gnesta; Hans Flodin, Vårby, both of Sweden

[73] Assignee: Alfa Laval Agri AB, Tumba, Sweden

[21] Appl. No.: 08/973,032

[22] PCT Filed: Apr. 25, 1996

[86] PCT No.: PCT/SE96/00547

§ 371 Date: Nov. 26, 1997

§ 102(e) Date: Nov. 26, 1997

[87] PCT Pub. No.: WO96/38035

PCT Pub. Date: Dec. 5, 1996

[30] Foreign Application Priority Data

May 30, 1995 [SE] Sweden .............................. 9501974-1

[51] Int. Cl.[6] ...................................................... A01J 5/04
[52] U.S. Cl. ...................................................... 119/14.47
[58] Field of Search ........................... 119/14.02, 14.47, 119/14.48, 14.49, 14.52

[56] References Cited

U.S. PATENT DOCUMENTS 1,285,079 11/1918 Eklundh et al. .
2,079,435 5/1937 Dinesen ................................ 119/14.47
2,484,696 10/1949 Dinesen .
3,104,647 9/1963 Rackleff ............................... 119/14.47
3,308,788 3/1967 Noorlander ........................... 119/14.47
4,610,220 9/1986 Goldberg et al. .................... 119/14.47
5,482,004 1/1996 Chowdhury ........................... 119/14.47

FOREIGN PATENT DOCUMENTS 922447 1/1955 Germany .
1238710 4/1967 Germany .
63885 4/1926 Sweden .

*Primary Examiner*—Thomas Price
*Attorney, Agent, or Firm*—Hovey, Williams Timmons & Collins

[57] ABSTRACT

A device (1), for example a teat liner, for reception of a teat comprising an element (2), which presents a thin, flexible wall surrounding a channel for reception for said teat, wherein said wall in a direction towards the channel has an inner side and in direction from the channel an outer side. The outer side of the wall is provided with a large number of surface enlargements (3), which have such a form, size and distribution that they form obstructions to propagation of cracks on the outer side of the wall. The invention also relates to a method for the manufacture of the device.

13 Claims, 4 Drawing Sheets

DEVICE FOR RECEPTION OF A TEAT AND A METHOD FOR ITS MANUFACTURE

TECHNICAL FIELD OF THE INVENTION

The present invention relates to a device for reception of a teat, comprising a thin flexible wall surrounding a channel for reception of said teat, wherein said wall in a direction towards the channel has an inner side and in a direction from the channel an outer side.

The invention also relates to a method for the manufacture of a device of this kind.

BACKGROUND OF THE INVENTION

A device of the above described kind is previously known from U.S. Pat. No. 1,285,079, which device constitutes a part of a teat liner which is usually made of nitrile rubber.

During manufacture of a rubber product, there always arise, in the material, discontinuities, which may consist of e.g. air or foreign particles. When load is put on the rubber product cracks may arise, which in that case firstly occurs in connection with the discontinuities.

It is commonly known that surface cracks are more dangerous for the strength of the rubber product than cracks inside the rubber product. It is accordingly especially important to hamper growth of cracks in the surface layer of the rubber product.

When a rubber product ages micro cracks also arise in its surface layer because of reduced elasticity of the rubber. These cracks propagate i.e. get larger, especially during loading of the rubber product. One reason for reduced elasticity of rubber in course of time is that this material is hygroscopic.

A newly produced teat liner made of nitrile rubber contains less than 0,3% water. A teat liner is during use contacted by milk during milking and detergent solution during subsequent cleaning. The milk as well as the detergent solution contains water, which is absorbed by the rubber material of the teat liner. The more water that is absorbed by the rubber material the more the teat liner loses its elasticity. Furthermore the tension of the rubber material is increased owing to this. When a known teat liner made of nitrile rubber is worn out, it contains about 3% water.

At this stage surface cracks have already arisen in the teat liner because of the reduced elasticity in combination with the movement that the teat liner has been forced to perform during milking. The movement has caused tensions in the teat liner that have promoted the growth of the cracks.

OBJECT OF THE INVENTION

The object of the present invention is to accomplish a device for reception of a teat, which device has a longer life than previously known such devices.

SUMMARY OF THE INVENTION

This object is obtained by a device of the initially defined kind, which is characterized in that at least a part of the outer side of the wall is provided with a large number of surface enlargements, which have such a form, size and distribution that they form obstructions to propagation of cracks on the outer side of the wall. Hereby is obtained a reduced risk for fatigue of the material in the wall.

The said surface enlargements are formed on the outer side of the wall in order to create intentional discontinuities with small mutual interspaces, which discontinuities are not limited by sharp edges such as normal surface cracks but form gentle transitions between recesses and protrusions of the outer side of the wall.

The intentional discontinuities provide a substantially less risk for crack growth than sharp naturally arisen cracks; the tension at the sharp crack edge is considerably larger than the tension at a rounded off crack edge at the same load level and is therefore more likely to result in fatigue of the material.

If a crack in spite of these intentional discontinuities would arise in the surface layer, the crack must turn at the surface enlargements, disregarding whether these are constituted by recesses or protrusions. Such a turn requires energy and the crack growth can in this way be hampered.

It is thus realized that the more surface enlargements that are arranged per unit area, the better the protection against crack growth.

It should however be noted that intentional discontinuities in the form of ribs, as disclosed in U.S. Pat. No. 1,285,079 cannot hamper crack growth, since the size of such ribs is much larger than the thickness of the surface layer of the teat liner.

According to a first embodiment of the invention the outer side of the wall has a surface with an area, which is at least 10% larger than the area of the surface of the inner side. According to a second embodiment of the invention the area is at least 50% larger than the area of the surface of the inner side. According to a third embodiment of the invention the area is at least 200% larger than the area of the surface of the inner side.

Preferably, the extension of the surface enlargements substantially across said channel is insignificant in comparison with the thickness of the wall.

Preferably, the inner side of the wall substantially lacks surface enlargements, obtaining that the surface of the device that is contacted by milk can easily be washed.

Suitably, the surface enlargements comprise protrusions on the outer side of the wall. Alternatively the surface enlargements comprise recesses on the outer side of the wall.

The number of surface enlargements per unit area is at least 100 pieces per square centimetre. According to a second embodiment the number of surface enlargements per unit area is at least 1,000 pieces per square centimetre.

Hereby is achieved surface enlargements that are relatively small and are substantially evenly distributed over the outer side of the flexible wall.

Preferably said device constitutes a part of a teat liner.

In addition to the fact that the surface enlargements provide an improved strength against crack growth, it has been established that they provide a larger evaporation of water from the outer side of the wall.

This evaporation contributes to a slower accumulation of water in the rubber, i.e. the rubber is more slowly saturated by water, which in turn contributes to an elongated life of the device.

The invention also comprises a method for the manufacture of a device of the above indicated kind, wherein a molding is produced with an inner side, which has irregularities adapted to form said surface enlargements, and the molding is used for molding of the device. Hereby is achieved a simple and inexpensive way of manufacturing a device according to the invention. The manufacture is suitably performed by injection molding, transfer molding, compression molding or casting.

Advantageously, the interior of the molding is provided with irregularities by mechanical treatment. Alternatively, the interior of the molding is provided with irregularities by chemical treatment.

Examples of mechanical treatment are spark machining, brushing, blasting, grinding, turning, hammering and glazing.

Examples of chemical treatment are chlorination and etching.

Certainly the surface enlargements could alternatively be produced by after treatment of the device, but such a method would be more expensive than the above indicated method.

The teat liner disclosed in the U.S. patent specification No. 1,285,079 is provided with longitudinally disposed ribs, having the function of preventing bending or wrinkling of the teat liner tranversely, which according to the document, might tend to rub or constrict the teat, causing a congestion of the blood therein and further tending to cause breakage of the teat liner wall. Any number of ribs may, according to the document, be provided, while in the drawing only five are shown.

However, the number of ribs that could at all be used to prevent bending or wrinkling of the teat liner is limited to a size of the ribs that would still reinforce the liner such that bending or wrinkling may be prevented. In contrast to the device according to the invention, ribs of this size cannot form obstructions to propagation of cracks, since a small crack in the surface of the liner would propagate across the ribs, due to the fact that the thickness of the surface layer is much smaller than the size of each rib.

Other teat liners that on the outer side are provided with irregularities which neither are of the same size nor have the same effect as the surface enlargements according to the present invention, are described in the German patent specifications 922 447, 922 742 and 936 724 and in the French patent specification 1 554 653.

DRAWING SUMMARY

The invention will now be closer described in the following with reference to the accompanying drawings, in which FIG. 1 shows a device according to the invention for reception of a teat, comprising a wall with surface enlargements, FIG. 2 shows schematically a first model of a surface enlargement, FIG. 3 shows schematically a second model of the surface enlargement, FIG. 4 shows schematically a third model of a surface enlargement in cross-section, FIG. 5 shows an example of distribution of surface enlargements on a surface, FIG. 6 is a photograph of a part of the device in FIG. 1 in about 10 times enlargement, and FIG. 7 is a photograph of a part of the device in FIG. 1 in about 200 times enlargement.

DETAILED DESCRIPTION OF PREFERRED EMBODIMENTS

FIG. 1 shows a device 1 in the form of a teat liner for reception of a teat of an animal to be milked, such as a cow, a sheep, a goat or a horse.

The device 1 comprises a capsule formed element 2 with a relatively thin wall. The outer side of the wall is provided with surface enlargements 3, while the inner side of the wall (not shown) is even.

FIG. 2 shows schematically a first model of a surface enlargement for quantifying of the degree of surface enlargement and the number of surface enlargements per unit area. The surface enlargement is approximated with a cross-section of an arc-formed slit with the depth of half a radius.

The degree of surface enlargement is achieved in this approximation by the ratio between the width of the slit and the length of the arc that follows the slit in its cross-direction, namely $$\pi r/(4r/\sqrt{2})$$

i.e. about 10%.

Of course this also relates to a protrusion formed in corresponding manner on the relevant surface as well as at a comparison of the areas of the inner side and outer side of the wall, if the inner side is even and the outer side is provided with surface enlargements 3.

FIG. 3 shows schematically a second model of a surface enlargement. The surface enlargement is approximated by an arc-formed slit having a depth of a radius.

The degree of surface enlargement is achieved in this approximation of the ratio between the width of the slit and the length of the half-circle that follows the slit in its cross-direction, $$2\pi r/4r$$

i.e. about 50%.

In order not to constitute indications of fracture, the slits shown in the FIGS. 2 and 3 should not be deep in relation to the thickness of the wall and they should also not be too long. It is accordingly preferable to provide the slits in such a way that their respective end terminates where the next slit extends in another direction in order to prevent crack growth along the slit.

FIG. 4 shows schematically a third model of a surface enlargement. The surface enlargement is approximated by a half spherical protrusion having the height of one radius.

The degree of the surface enlargement is in this approximation achieved by the ratio between the surface of the hemispheres and the surface of the circle that is covered by the hemispheres, namely $$2\pi r^2/\pi r^2$$

i.e. about 200%.

Of course, this is also the case for a surface enlargement in the form of a half spherical protrusion in the surface having the height of one radius.

Naturally, there should in reality be no sharp edges between the wall and the surface enlargement, but the surface enlargements shown in FIGS. 2, 3 and 4 are only represented in this way in order to achieve a simple mathematical model.

FIG. 5 shows a surface with a plurality of hemispheres according to FIG. 4 distributed over a surface. The hemispheres are placed against one another, which means that the centres of two adjacent hemispheres are at the distance of two radii from one another. One embodiment of the invention comprises such hemispheres, the radius of which is half a millimeter, which implies a density of 100 hemispheres, i.e. 100 surface enlargements per square centimeter.

In order to even more minimize the risk for crack growth it is however suitable to provide the exterior of the wall with at least 1,000 surface enlargements per square centimeter.

Figure 1:
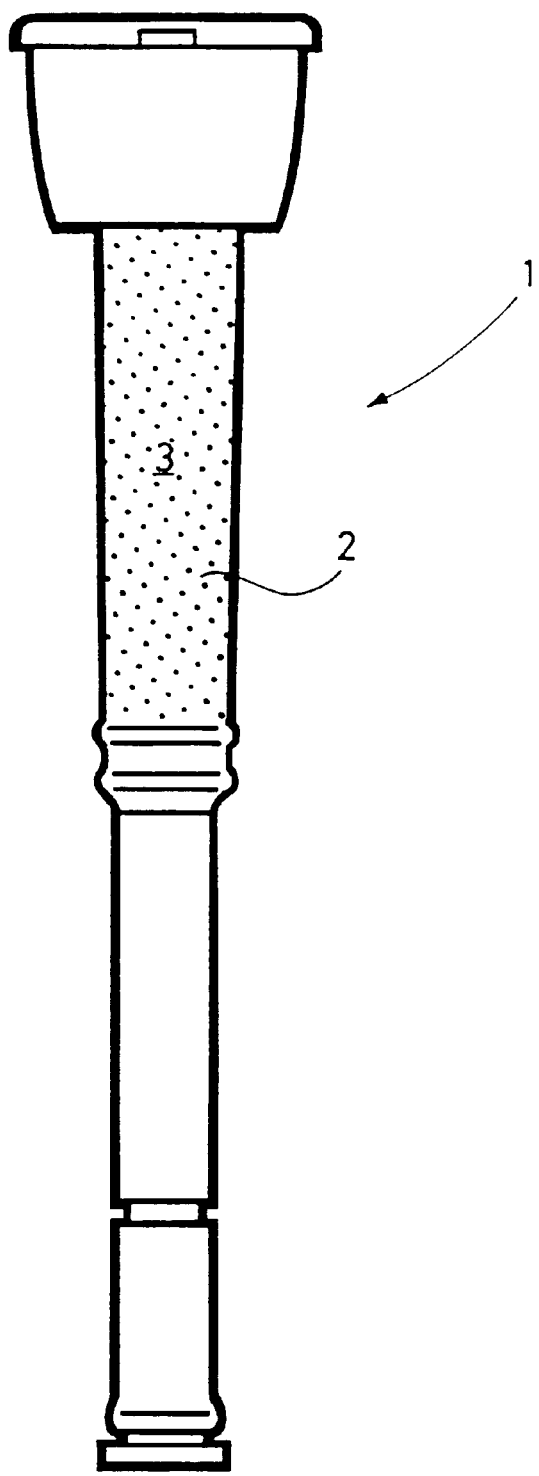
Figure 2:
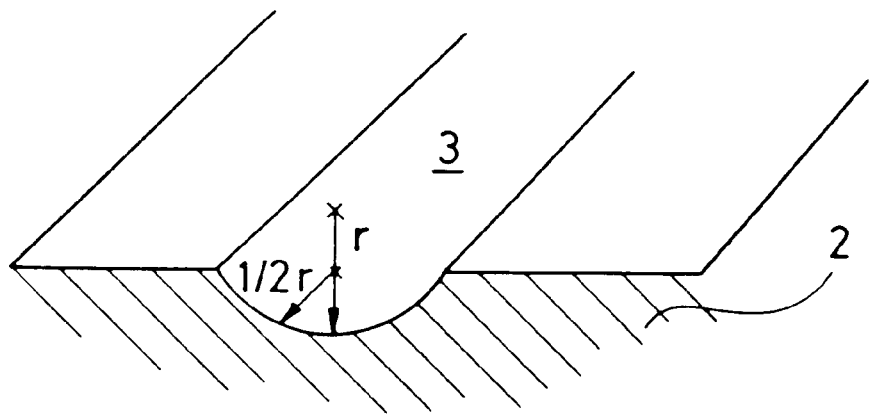
Figure 3:
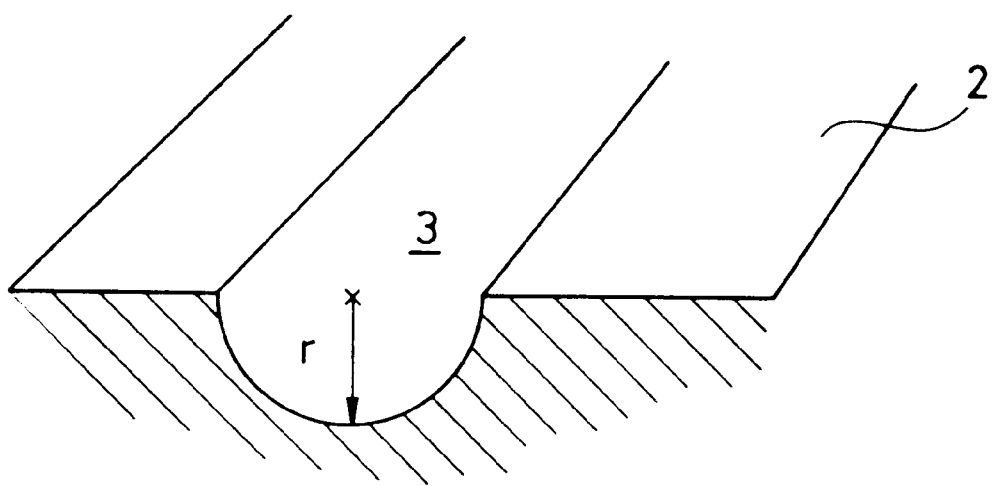
Figure 4:
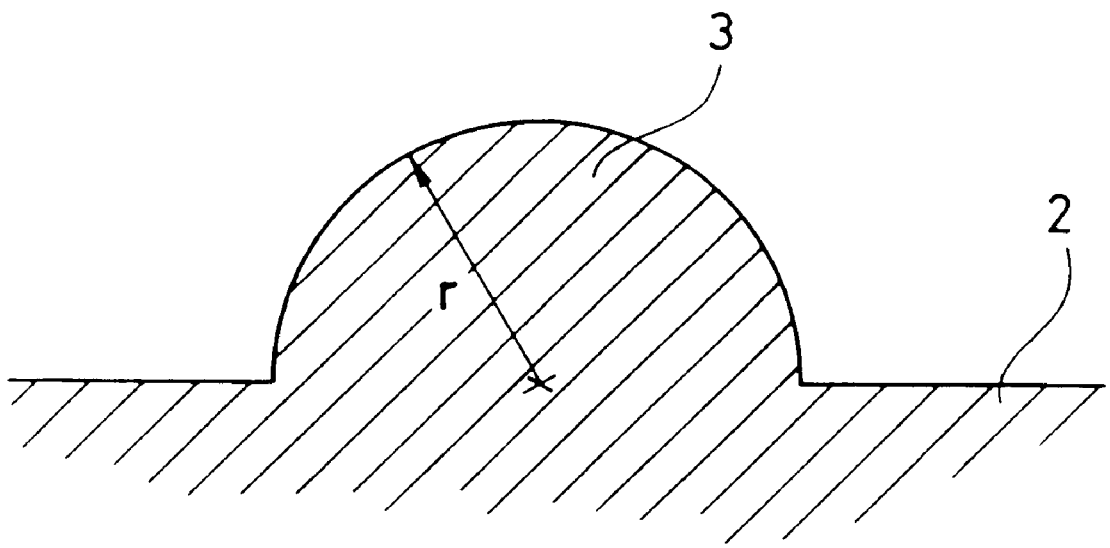
Figure 5:
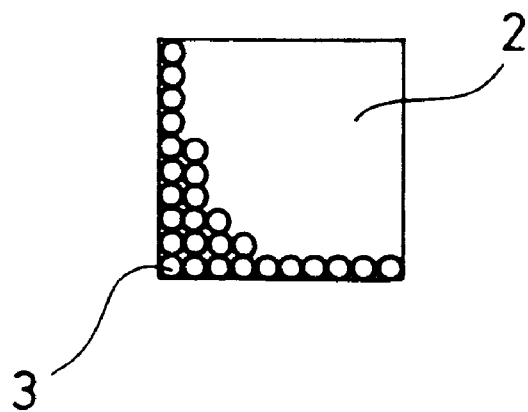
Figure 6:
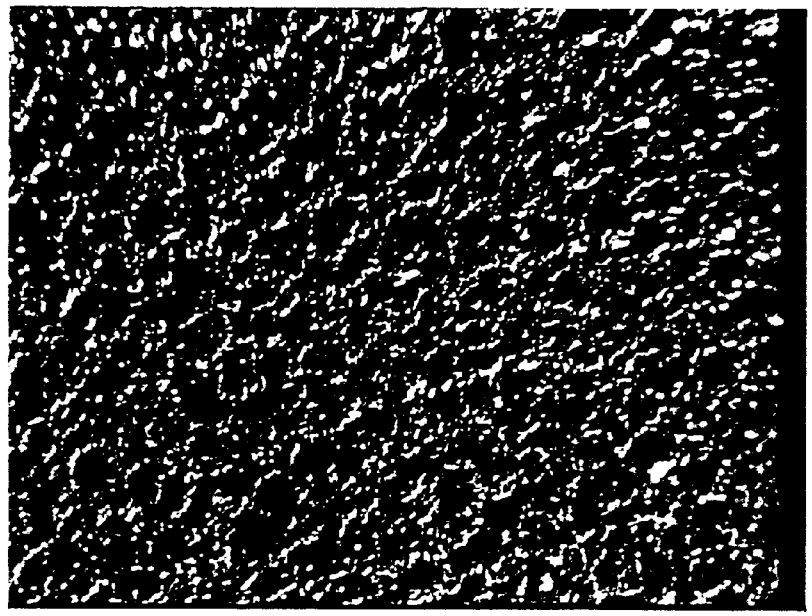
FIG. 6 shows in about 10 times enlargement a part of the outer side of the wall comprising a large number of surface enlargements 3.
Figure 7:
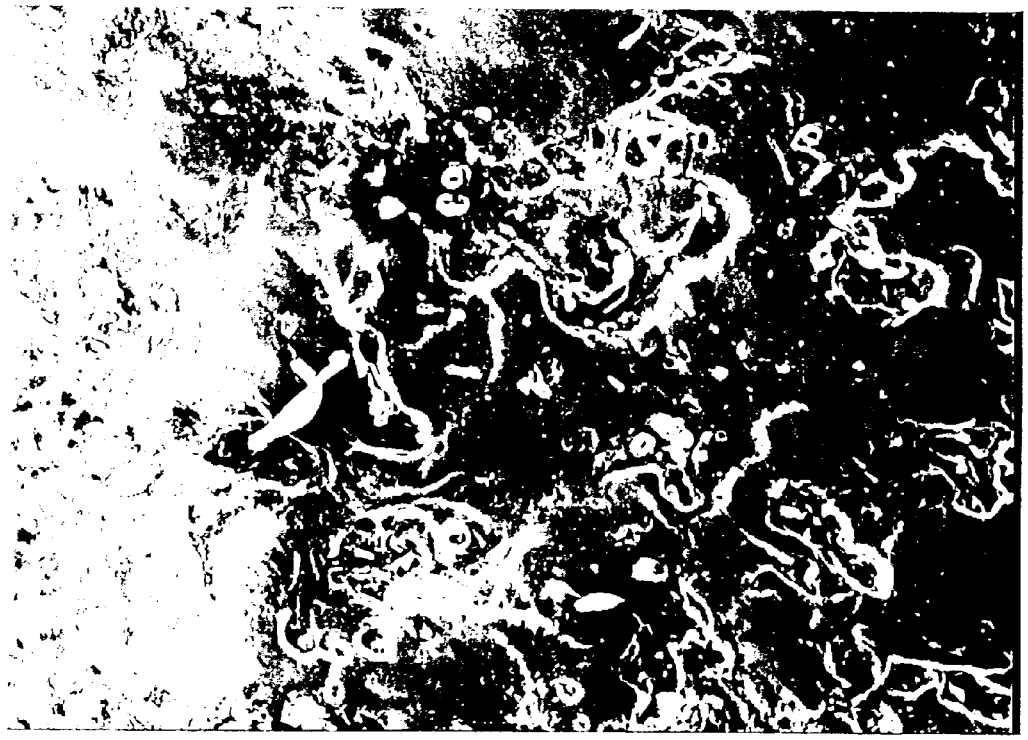
FIG. 7 shows the surface enlargements of FIG. 6 in about 200 times enlargement. The surface enlargements are, as is obvious, very different in form and size.

The invention is not limited to the above indicated embodiments, but also variations thereof are possible.

Consequently, the device may be provided with more than one element 2 with surface enlargements. Likewise the surface enlargements may form a regular as well as a stochastic pattern. Likewise several large or small parts of the device may be provided with surface enlargements, for example in a plurality of fields.

The number of surface enlargements per unit area is also not limited to what is indicated above, but can certainly be 10,000 pieces per square centimeter, 100,000 pieces per square centimeter or even more.

We claim:

1. A device for reception of a teat, comprising a thin flexible wall surrounding a channel for reception of the teat, said wall presenting an inner side oriented in a direction towards the channel and an outer side oriented away from the channel, wherein at least a part of the outer side of the wall in a surface layer thereof is provided with a substantially evenly distributed large number of surface enlargements, said enlargements being of a size substantially across said channel which is insignificant in comparison with the thickness of the wall and being limited by non-sharp edges, thereby providing intentional discontinuities forming obstructions to propagation of cracks on the outer side of the wall.

2. A device according to claim 1, wherein the inner side of the wall has a surface and the outer side of the wall has a surface, wherein the surface of the outer side including the enlargements has an area which is at least 10% larger than the area of the surface of the inner side.

3. A device according to claim 2, wherein the surface of the outer side including the enlargements has an area which is at least 50% larger than the area of the surface of the inner side.

4. A device according to claim 3, wherein the surface of the outer side including the enlargements has an area which is at least 200% larger than the area of the surface of the inner side.

5. A device according to claim 1, wherein the inner side of the wall substantially lacks surface enlargements.

6. A device according to claim 1, wherein the surface enlargements comprise protrusions on the outer side of the wall.

7. A device according to claim 1, wherein the surface enlargements comprise recesses on the outer side of the wall.

8. A device according to claim 1, wherein the number of surface enlargements per unit area is at least 100 per square centimeter.

9. A device according to claim 1, wherein the number of surface enlargements is at least 1000 per square centimeter.

10. A device according to claim 1, wherein said device constitutes a part of a teat liner.

11. A method for the manufacture of a device claim 1, wherein a molding is produced with an inner side, which has irregularities adapted to form said surface enlargements, and the molding is used for molding of the device.

12. A method according to claim 11, wherein the interior of the molding is provided with irregularities by mechanical treatment.

13. A method according to claim 11, wherein the interior of the molding is provided with irregularities by chemical treatment.

* * * * *